United States Patent Office 3,459,724
Patented Aug. 5, 1969

3,459,724
OXIDATION OF POLYVINYL ALCOHOLS
Heinz Hartel, Oberlar, and Gerhard Bier, Troisdorf, Germany, assignors to Dynamit Nobel Aktiengesellschaft, Troisdorf, Germany
Filed Nov. 26, 1965, Ser. No. 509,902
Claims priority, application Germany, Dec. 19, 1964, D 46,096
Int. Cl. C08f 27/22
U.S. Cl. 260—91.3     11 Claims

ABSTRACT OF THE DISCLOSURE

Process for oxidizing polyvinyl alcohols to produce polyenols comprising reacting in an alkaline aqueous medium a polyvinyl alcohol with Cu (II) oxide or hydroxide in the presence of a noble metal, its oxide or hydroxide.

---

Figure 1:
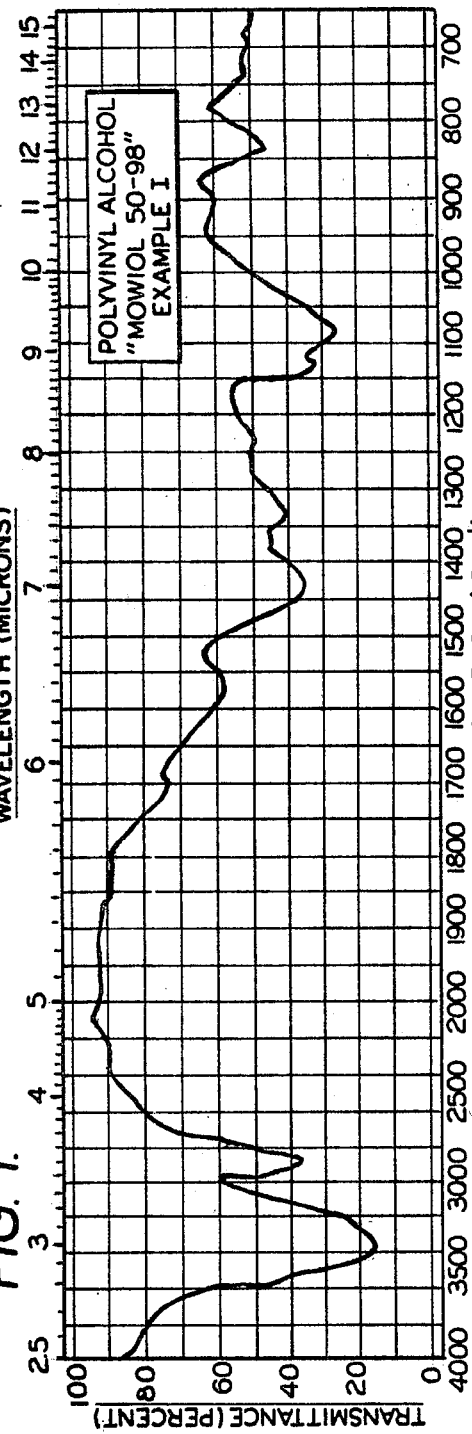
Figure 2:
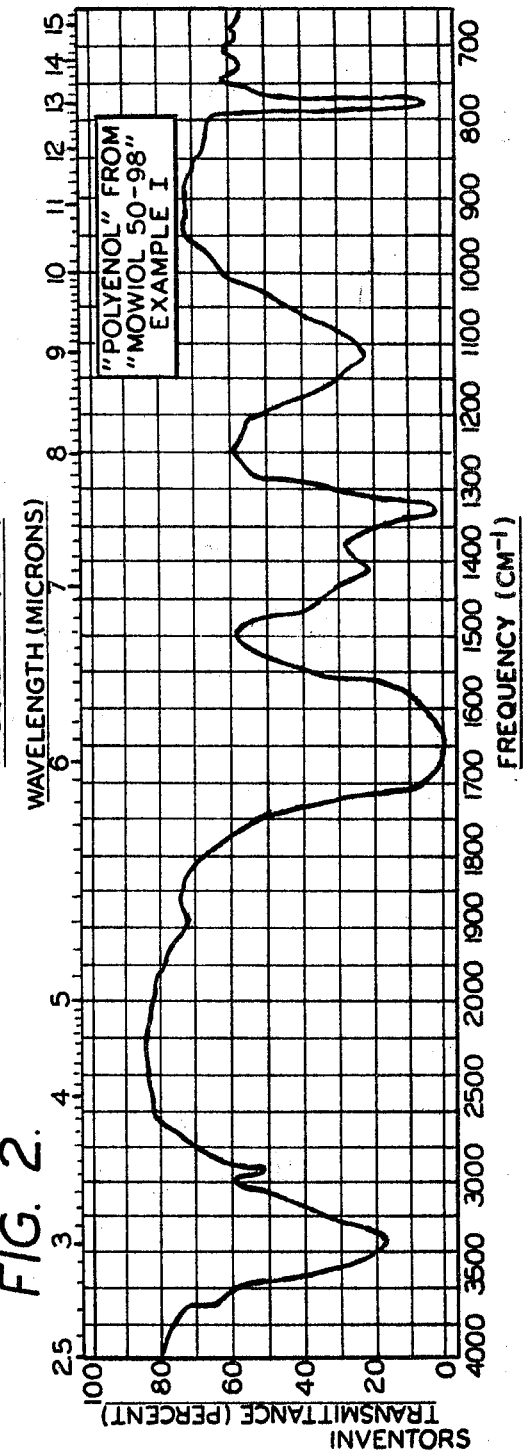

The present invention relates to a process for the oxidation of polyvinyl alcohols, and more particularly relates to a process for the oxidation of polyvinyl alcohols to produce polyenols.

In co-pending U.S. patent application Ser. No. 472,737 now U.S. Patent No. 3,387,029, there is disclosed a process for the oxidation of polyacroleins by acting on the latter in an alkaline aqueous medium with a mixture of copper (II) oxide or copper (II)) hydroxide and a noble metal or noble metal oxide or hydroxide, to produce the corresponding polycarboxylic acids. Preferably this oxidation reaction is effected in the presence of a solvent for the polyacroleins. Additionally, oxygen or gases containing oxygen can be introduced simultaneously into the reaction mixture.

In accordance with the invention, it has now been found that the oxidation of polyvinyl alcohols can be effected by reacting in an alkaline aqueous medium a polyvinyl alcohol with a mixture of copper (II) oxide or copper (II) hydroxide and a noble metal, noble metal oxide, or noble metal hydroxide. The polymers obtained by the process of the invention through the oxidation of the polyvinyl alcohol are new materials and surprisingly exhibit substantially the following enol structure:

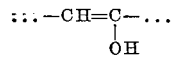

The said polymers dissolve in water, alkalies, phenol and formamide, and are insoluble in ether, alcohols, benzene, chloroform, methylene chloride, dioxane, tetrahydrofuran, acetic acid ester and higher aromatic hydrocarbons.

Following completion of the oxidation of the polyvinyl alcohol in accordance with the invention, the polymers produced can be, after neutralization of their solutions with for example, formic acid or acetic acid, precipitated and isolated in pure form from their concentrated aqueous alkaline solutions by means of alcohols, such as methanol, ethanol, propanol, isopropanol, butanol, or isobutanol.

The polyenols produced by the process of the present invention constitute novel, stable polyfunctional compounds which are distinguishable from polyvinyl alcohols by an augmented thermal stability. For example, the polyvinyl alcohol known commercially as "Mowiol 30–98" undergoes a great weight loss starting at a temperature of 223° C. while the polyenol prepared from "Mowiol 30–98" remains completely stable thermally up to a temperature of 320° C.

The polyenols of the invention are suitable as thermally stable thickening agents and intermediates for plasticizers. They can be used also as textile adjuvants and to modify the properties of other polymers.

It is advantageous to carry out the process of the invention by using for the oxidation of the polyvinyl alcohol in alkaline aqueous solution a mixture of copper (II) oxide or copper (II) hydroxide and a noble metal or noble metal oxide or a noble metal hydroxide in a molar ratio of 1:1 to about 1000:1 as oxidant. The noble metal, metal oxide, or hydroxide suitable for use in admixture with a copper oxide or hydroxide include the elements, oxides, and hydroxides of all of the noble metals such as, for example, mercury, silver, gold, and the platinum metals, i.e., platinum, ruthenium, rhodium, palladium, osmium and iridium.

The oxidation is carried out at temperatures of from 0° C. to 100° C., and preferably at 100° C. If, at the same time, oxygen or gases containing oxygen are introduced, the consumed oxidant is continually regenerated, so that smaller quantities of the oxide mixture are required than theoretically necessary.

The alkaline aqueous medium can be prepared with sodium hydroxide, potassium hyroxide or the like.

The polyvinyl alcohol starting materials suitable for use in accordance with the invention are illustrated by the Mowiols, the latter having molecular weights in the range of from 30,000 to 50,000.

The starting polyvinyl alcohol and resulting polyenol are easily characterized by their I.R. spectra. The I.R. spectra for the starting polyvinyl alcohol (Mowiol 50–98) and for the resulting polyenol are shown in the attached drawing.

Example 1

132 g. polyvinyl alcohol (commercially known as "Mowiol 50–98") were heated for 15 hours at 100° C. with 480 g. CuO, 1.35 g. Ag$_2$O (molar ratio 9:1) and 3,000 g. of a normal NaOH solution. The solution thereby formed was filtered, concentrated and neutralized with acetic acid. The polyenol (35 g.) was precipitated out of solution by the addition of methanol. The enol group content as determined by titration amounted to 77.9%.

Example 2

132 g. polyvinyl alcohol (commercially known as "Mowiol 50–98") were heated for 15 hours using reflux, together with 48 g. CuO, 1.35 g. Ag$_2$O and 2750 g. of normal NaOH solution with the introduction of oxygen. The solution which formed was separated from the solid matter, concentrated to about 80%, and neutralized with formic acid. The polyenol was then precipitated out of solution by the addition of ethanol. The yield amounted to 33 g.

Example 3

The same procedure as set out in Example 2 was followed but with the addition of 0.8 g. of silver dust in place of the silver oxide and a corresponding quantity of KOH in the form of a 15 weight percent solution. 29 g. polyenol was obtained by precipitation with methanol after the reaction process had been completed.

What is claimed is:
1. A process for oxidizing polyvinyl alcohols which comprises reacting in an alkaline aqueous medium a polyvinyl alcohol with a Cu (II) oxide or hydroxide in the presence of a member selected from the group consisting of noble metals, noble metal oxides, and noble metal hydroxides to produce polyenols containing units having the formula

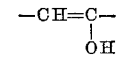

2. A process for oxidizing polyvinyl alcohols which comprises reacting in an alkaline aqueous medium a polyvinyl alcohol with a Cu (II) oxide or hydroxide in the presence of a member selected from the group consisting of metallic silver, mercury, gold, platinum, osmium, iridium, ruthenium, rhodium, and palladium, and the oxides and hydroxides thereof to produce polyenols containing units having to formula $$-CH=C-$$
$$\phantom{-CH=}|$$
$$\phantom{-CH=}OH$$

3. A process according to claim 2 wherein said Cu (II) compound is CuO.

4. A process according to claim 2 which comrises making and maintaining said aqueous medium alkaline by the addition thereto of a member selected from the group consisting of alkali metal hydroxides, carbonates, and bicarbonates.

5. A process according to claim 3 wherein said group member is an oxide and said reaction with CuO is carried out using a molar ratio of CuO to said oxide group member amounting to from 1:1 to 1000:1.

6. A process according to claim 1 wherein said reaction is carried out at a temperature of from 0–100° C.

7. A process according to claim 1 wherein said reaction is carried out at 100° C.

8. A process according to claim 1 which comprises introducing a member selected from the group consisting of oxygen and gases containing oxygen into said reaction medium during said oxidizing reaction whereby the metal compounds used up in said reaction are regenerated to a higher oxidation stage.

9. A process according to claim 8 wherein said oxidation and regeneration treatments are effected at a temperature of about 0–100° C.

10. A process for oxidizing polyvinyl alcohols which comprises reacting in an alkaline aqueous medium, a polyvinyl alcohol with CuO in the presence of Ag$_2$O.

11. A process for oxidizing polyvinyl alcohols which comprises reacting in an alkaline aqueous medium a polyvinyl alcohol with a Cu (II) oxide or hydroxide in the presence of a member selected from the group consisting of noble metals, noble metal oxides, and noble metal hydroxides neutralizing the oxidation mixture and recovering the polyenol therefrom to produce polyenols containing units having the formula $$-CH=C-$$
$$\phantom{-CH=}|$$
$$\phantom{-CH=}OH$$

References Cited

UNITED STATES PATENTS

| 2,924,535 | 2/1960 | Schaefer | 117—33.3 |
| 3,052,662 | 9/1962 | Shiraishi et al. | 260—91.3 |

OTHER REFERENCES

CA, 46, 1294(a).

JOSEPH L. SCHOFER, Primary Examiner
STANFORD M. LEVIN, Assistant Examiner